United States Patent
Zhang et al.

(10) Patent No.: US 12,170,943 B2
(45) Date of Patent: Dec. 17, 2024

(54) METHOD FOR REPORTING CSI OF MULTI-HOP PATH AND RELATED APPARATUS

(71) Applicant: HUAWEI TECHNOLOGIES CO., LTD., Guangdong (CN)

(72) Inventors: Lili Zhang, Beijing (CN); Peng Zhang, Shanghai (CN); Hua Xu, Ottawa (CA)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 309 days.

(21) Appl. No.: 17/853,305

(22) Filed: Jun. 29, 2022

(65) Prior Publication Data

US 2022/0330130 A1 Oct. 13, 2022

Related U.S. Application Data

(63) Continuation of application No. PCT/CN2019/130935, filed on Dec. 31, 2019.

(51) Int. Cl.
*H04W 40/12* (2009.01)
*H04W 72/20* (2023.01)

(52) U.S. Cl.
CPC .......... *H04W 40/12* (2013.01); *H04W 72/20* (2023.01)

(58) Field of Classification Search
CPC ..... H04W 40/12; H04W 72/20; H04W 24/10; H04W 84/18; H04L 1/0026; H04L 5/0023; H04L 5/0033; H04L 5/0057; H04L 5/0091; H04L 2001/0097
See application file for complete search history.

(56) References Cited

U.S. PATENT DOCUMENTS

| 2014/0133390 A1 | 5/2014 | Kwon et al. | |
| 2018/0262367 A1* | 9/2018 | Alieiev | H04W 24/10 |
| 2022/0303865 A1* | 9/2022 | Li | H04W 40/20 |

(Continued)

FOREIGN PATENT DOCUMENTS

| CN | 106028395 A | 10/2016 |
| CN | 108076516 A | 5/2018 |
| CN | 108093454 A | 5/2018 |

(Continued)

OTHER PUBLICATIONS

RP-140518, Qualcomm Incorporated, Work item proposal on LTE Device to Device Proximity Services, 3GPP TSG RAN Meeting #63, Fukuoka, Japan, Mar. 3-6, 2014, 7 pages.

(Continued)

*Primary Examiner* — Hashim S Bhatti
(74) *Attorney, Agent, or Firm* — WOMBLE BOND DICKINSON (US) LLP

(57) ABSTRACT

Embodiments of this application disclose a method for reporting CSI of a multi-hop path and a related apparatus. The method includes: The multi-hop path includes a first device, a second device, and a third device, where the first device is a source device, and the second device is a target device. The first device obtains a first CSI report of a target transmission path. The first CSI report indicates the target transmission path. According to embodiments of this application, so that a comprehensive channel state of the multi-hop path can be obtained from a data sending device, namely, the source device, by reporting first CSI.

20 Claims, 6 Drawing Sheets

(56) References Cited

U.S. PATENT DOCUMENTS

2023/0319605 A1* 10/2023 Park .................... H04J 11/00
370/252

FOREIGN PATENT DOCUMENTS

| CN | 108574543 A | 9/2018 |
| CN | 106465223 B | 12/2019 |
| EP | 3136785 A1 | 3/2017 |

OTHER PUBLICATIONS

RP-150441, Qualcomm Incorporated, Revised WI: Enhanced LTE Device to Device Proximity Services, 3GPP TSG RAN Meeting #67, Shanghai, China, Mar. 9-12, 2014, 8 pages.

* cited by examiner

S401: The first device obtains a first CSI report of a target transmission path ions of user equipment cooperation technologies. From a perspective of the 3GPP standard development history, technologies included in user equipment cooperation, such as communication between UEs and UE-to-Network relaying, have been studied in the 3GPP before. UE-to-Network relaying is a technology in which UE helps another UE communicate with a base station, and is also referred to as a relay (Relay) technology. It may be considered that both the D2D technology and the Relay technology that have been studied before are a part of the user equipment Cooperation technologies.

METHOD FOR REPORTING CSI OF MULTI-HOP PATH AND RELATED APPARATUS

CROSS-REFERENCE TO RELATED APPLICATIONS

This application is a continuation of International Application No. PCT/CN2019/130935, filed on Dec. 31, 2019, the disclosure of which is hereby incorporated by reference in its entirety.

TECHNICAL FIELD

This application relates to the field of communication technologies, and in particular, to a method for reporting CSI of a multi-hop path and a related apparatus.

BACKGROUND

A device-to-device (D2D) communication technology is introduced and standardized in the 3rd Generation Partnership Project (3GPP), Long Term Evolution (LTE) Release 12 Rel-12, so that user equipment (UE) can directly communicate with each other, to meet requirements of emerging services such as public safety. (It should be noted that D2D at that time supported only UE discovery within a network coverage area and communication between UEs. The communication may be in a unicast or broadcast manner, and support scenarios in which all UEs are within the network coverage, a part of UEs is within the network coverage, a part of UEs is out of the network coverage, or all UEs are out of the network coverage). A device-to-network relaying UE-to-Network relaying technology is introduced and standardized in LTE Rel-13. With this technology, a network can use the D2D technology introduced in Rel-12, to extend network coverage through layer-3 relaying Layer 3 Relay, so that UE outside the network coverage can be served by using UE within the network coverage. In addition, in Rel-14/15/16, a project for vehicle-to-everything (V2X) is successfully initiated as a main application of the D2D technology. V2X further includes various application requirements of vehicle-to-vehicle (V2V), vehicle-to-pedestrian (e.g., Vehicle-to-Person, V2P), vehicle-to-infrastructure (V2I), and vehicle-to-roadside unit (Vehicle-to-RSU, V2R). V2V refers to LTE-based vehicle-to-vehicle communication. V2P refers to LTE-based vehicle-to-person (including a pedestrian, a person riding a bicycle, a driver, or a passenger) communication. V2R refers to LTE-based vehicle-to-roadside unit (RSU) communication. In addition, V2I may further include V2N, and V2N refers to LTE-based vehicle-to-base station/network communication. A roadside unit (RSU) includes two types: a terminal-type RSU and a base station-type RSU. Because the terminal-type RSU is deployed on a roadside, the terminal-type RSU is in a non-mobile state, and mobility does not need to be considered. The base station-type RSU can provide timing synchronization and resource scheduling for a vehicle that communicates with the base station-type RSU. User equipment cooperation (UE cooperation) can be performed regardless of being in an existing D2D, V2V or V2X application scenario, a 5th generation mobile communication technology (5G V2X) application scenario, and a future sidelink application scenario.

From a perspective of communication theory development and application scenario requirements, new radio (NR) Release 17 Rel-17 is a good opportunity for commercial- Currently, data relaying in the user equipment cooperation technologies discussed in the related standard is limited to relaying between a base station and in-coverage edge UE and then to out-of-coverage UE. That is, when data is sent from a base station, if target UE is outside signal coverage of the base station, the target UE cannot directly receive transmission from the base station, data relaying may be performed by in-coverage edge UE. How to obtain a channel state of such a multi-hop path that includes a relay device is a problem to be resolved.

SUMMARY

Embodiments of this application provide a method for reporting CSI of a multi-hop path and a related apparatus, so that a comprehensive channel state of a multi-hop path can be obtained from a data sending device, namely, a source device, by reporting first CSI.

According to a first aspect, an embodiment of this application provides a method for reporting CSI of a multi-hop path. The multi-hop path includes a first device, a second device, and a third device, where the first device is a source device, and the second device is a target device. The method includes:

The first device obtains a first CSI report of a target transmission path. The first CSI report indicates a channel state of a multi-hop transmission link in the target transmission path.

According to this embodiment of this application, the first device obtains the first CSI report of the target transmission path. Because the first CSI report indicates the target transmission path, a comprehensive channel state of the multi-hop path can be obtained from a data sending device, namely, the source device, by reporting first CSI.

In one embodiment, the first CSI report is a joint CSI report, and the joint CSI report indicates a joint channel state of the multi-hop transmission link in the target transmission path. It can be learned that the joint channel state of the target transmission path is indicated by using the joint CSI report, so that a multi-hop transmission path can be accurately indicated.

In one embodiment, the first CSI report is multi-level CSI, CSI at any level represents a CSI indication of a corresponding transmission link, and the transmission link is a direct path obtained by grouping the target transmission path based on a node connection relationship. It can be learned that the joint CSI report uses multi-level CSI, so that a channel state of each transmission link in the multi-hop path is clearly indicated, which is simple and efficient.

In one embodiment, the first CSI report is CSI obtained according to a first function. It can be learned that the comprehensive channel state of the multi-hop path in the target transmission path is calculated by using the first function, so that an amount of information is small and transmission is efficient.

In one embodiment, the first function is a function defined based on multi-level CSI of the target transmission path, and the multi-level CSI corresponds to a plurality of transmission links obtained by grouping the target transmission path based on a node connection relationship. It can be learned that the comprehensive channel state of the multi-hop path in the target transmission path is calculated by using the first function, so that an amount of information is small and transmission is efficient.

In one embodiment, the target transmission path is a transmission path that meets a preset reporting condition. It can be learned that a CSI reporting trigger condition of a CSI reporting device is restricted by using the preset reporting condition, effectively limiting repeated and invalid reporting of a low-quality transmission path and improving signaling transmission efficiency.

In one embodiment, the preset reporting condition includes at least one of the following: First CSI of the transmission path is greater than or equal to a first preset threshold. It can be learned that a transmission path in which CSI good enough is reported helps the source device identify a corresponding path that can ensure reliable transmission of the to-be-transmitted data, thereby improving reliable transmission of the data and improving spectrum utilization.

The first CSI of the transmission path is less than or equal to a second preset threshold. It can be learned that reporting a transmission path with CSI not good enough helps the source device avoid using a corresponding path that cannot ensure reliable transmission of the to-be-transmitted data, thereby improving spectrum utilization.

In one embodiment, reporting of the first CSI report is triggered in the following manner: The reporting of the first CSI report is triggered by using a sidelink control information SCI indication field. It can be learned that the first device may trigger, by using the SCI indication field, a device to report the first CSI report, so that no other dedicated signaling needs to be configured for the device that reports the first CSI report, thereby improving information indication efficiency.

In one embodiment, reporting of the first CSI report is triggered in the following manner: The reporting of the first CSI report is triggered by using higher layer signaling configuration. It can be learned that the first device may trigger, by using the higher layer signaling configuration, the device to report the first CSI report, so that the device reporting the first CSI report can make a real-time response based on scheduling performed by the base station, thereby reducing a delay and improving efficiency.

In one embodiment, that the first device obtains a first CSI report of a target transmission path includes: The first device receives the first CSI report of the target transmission path reported by the third device, where the third device is a next-hop device of the first device in the target transmission path. It can be learned that first CSI is reported by using the next-hop device of the first device in the target transmission path. The next-hop device may obtain channel state information of a plurality of links connected to the next-hop device; therefore, the first CSI may include multi-hop information in the target transmission path, so that path state information that is more comprehensive can be obtained from the source device, thereby improving a transmission success rate and efficiency and improving spectrum utilization.

In one embodiment, after the first device obtains the first CSI report of the target transmission path, the method further includes: The first device prioritizes the target transmission paths based on the first CSI report. It can be learned that classified transmission control can be performed on the transmission data more precisely through level classification of the transmission paths, thereby improving transmission path utilization and transmission stability.

According to a second aspect, an embodiment of this application provides a method for reporting CSI of a multi-hop path. The multi-hop path includes a first device, a second device, and a third device, where the first device is a source device, and the second device is a target device. The method includes:

The third device sends a first CSI report of a target transmission path to the first device. The third device is a next-hop device of the first device in the target transmission path, and the first CSI report indicates the target transmission path.

According to this embodiment of this application, the first device obtains the first CSI report of the target transmission path reported by the third device. Because the first CSI report indicates the target transmission path, a comprehensive channel state of the multi-hop path can be obtained from a data sending device, namely, the source device, by reporting first CSI.

In one embodiment, the first CSI report is a joint CSI report, and the joint CSI report indicates a joint channel state of a multi-hop transmission link in the target transmission path.

In one embodiment, the first CSI report is multi-level CSI, CSI at any level represents a CSI indication of a corresponding transmission link, and the transmission link is a direct path obtained by grouping the target transmission path based on a node connection relationship.

In one embodiment, the first CSI report is CSI obtained according to a first function.

In one embodiment, the first function is a function defined based on multi-level CSI of the target transmission path, and the multi-level CSI corresponds to a plurality of transmission links obtained by grouping the target transmission path based on a node connection relationship.

In one embodiment, the target transmission path is a transmission path that meets a preset reporting condition.

In one embodiment, the preset reporting condition includes at least one of the following:

First CSI of the transmission path is greater than or equal to a first preset threshold; and the first CSI of the transmission path is less than or equal to a second preset threshold.

In one embodiment, reporting of the first CSI report is triggered in the following manner:

The reporting of the first CSI report is triggered by using a sidelink control information SCI indication field.

In one embodiment, reporting of the first CSI report is triggered in the following manner:

The reporting of the first CSI report is triggered by using higher layer signaling configuration.

According to a third aspect, an embodiment of this application provides an apparatus for reporting CSI of a multi-hop path. The apparatus is used in a first device. The multi-hop path includes the first device, a second device, and a third device, where the first device is a source device, and the second device is a target device. The apparatus includes:

a transceiver unit, configured to obtain a first CSI report of a target transmission path by using the communication unit, where the first CSI report indicates a channel state of a multi-hop transmission link in the target transmission path.

According to a fourth aspect, an embodiment of the disclosure provides a communication apparatus. The terminal is a third device and includes a memory, a transceiver, and at least one processor. The memory stores instructions; the memory, the transceiver, and the at least one processor are interconnected through lines; and the processor is configured to invoke the instructions to perform the operations in any one of the methods according to the first aspect or the second aspect.

According to a fifth aspect, an embodiment of the disclosure provides a communication apparatus, including a processor and an interface circuit.

The interface circuit is configured to receive code instructions and transmit the code instructions to the processor. The processor executes the code instructions to perform the operations in any one of the methods according to the first aspect or the second aspect.

According to a sixth aspect, an embodiment of the disclosure provides a computer-readable storage medium. The readable storage medium is configured to store instructions. When the instructions are executed, the operations in any one of the methods according to the first aspect or the second aspect are performed.

According to a seventh aspect, an embodiment of the disclosure provides a computer program product. When the computer program product runs on a communication apparatus, the operations in any one of the methods according to the first aspect or the second aspect are performed.

BRIEF DESCRIPTION OF DRAWINGS

To describe the technical solutions in embodiments or the background of this application more clearly, the following briefly describes the accompanying drawings used in describing embodiments or the background of this application.

DESCRIPTION OF EMBODIMENTS

The following describes embodiments of this application with reference to the accompanying drawings in embodiments of this application.

Figure 1:
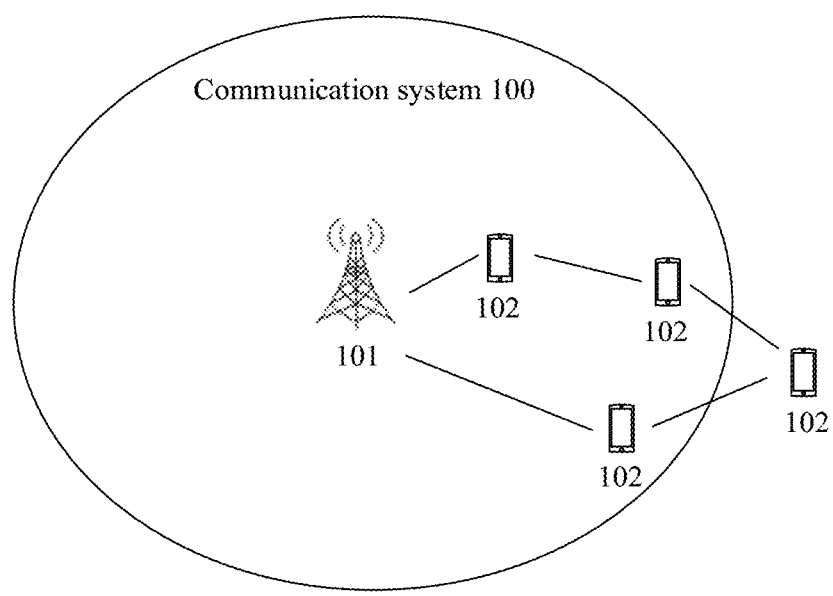
FIG. 1 is a schematic diagram of an architecture of a communication system according to an embodiment of this application.

FIG. 1 is a schematic diagram of a communication system according to an embodiment of this application. A communication system 100 may be a 5th generation 5G mobile communication system, a 6th generation 6G mobile communication system, or any future communication system.

The system may include at least one network device 101 (only one network device is shown) and one or more terminal devices 102 connected to the network device 101. The network device 101 may perform wireless communication with the terminal device 102 by using one or more antennas. Each network device 101 can provide communication coverage for a coverage area 104 corresponding to the network device 101. The coverage area 104 corresponding to the network device 101 may be divided into a plurality of sectors. One sector corresponds to a part of the coverage area (not shown).

In this embodiment of this application, the network device 101 may include a base transceiver station, a radio transceiver, a basic service set (BSS), an extended service set (ESS), a NodeB (Node B), an evolved NodeB (eNB or eNodeB), a next-generation NodeB (next-generation Node B, gNB), or the like. The communication system 100 may include network devices 101 of several different types, for example, a macro base station and a micro base station. The network device 101 may alternatively be a small cell, a transmission node (Transmission Reference Point, TRP), or the like. The network device 101 may use different radio technologies, for example, a cell radio access technology or a WLAN radio access technology.

In this embodiment of this application, the terminal device 102 is a device having a wireless transceiver function, and may be deployed on land, including an indoor device, an outdoor device, a handheld device, a wearable device, or a vehicle-mounted device. The terminal device 102 may alternatively be deployed on water (for example, on a ship) or in the air (for example, on an airplane, a balloon, or a satellite). The terminal device may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in smart grid, a wireless terminal in transportation safety, a wireless terminal in smart city, a wireless terminal in smart home, or the like. An application scenario is not limited in embodiments of this application. The terminal device may sometimes be referred to as user equipment (UE), a terminal, an access terminal, a UE unit, a UE station, a mobile device, a mobile console, a mobile station, a mobile terminal, a mobile client, a mobile unit, a remote station, a remote terminal device, a remote unit, a radio unit, a wireless communication device, a user agent, a user apparatus, or the like.

It should be noted that terms "system" and "network" in embodiments of this application may be used interchangeably. "A plurality of" means two or more. In view of this, "a plurality of" may also be understood as "at least two" in embodiments of this application. "And/or" describes an association relationship between associated objects and represents that three relationships may exist. For example, A and/or B may represent the following three cases: Only A exists, both A and B exist, and only B exists. In addition, the character "/" generally indicates an "or" relationship between the associated objects if there is no special description.

Figure 2:
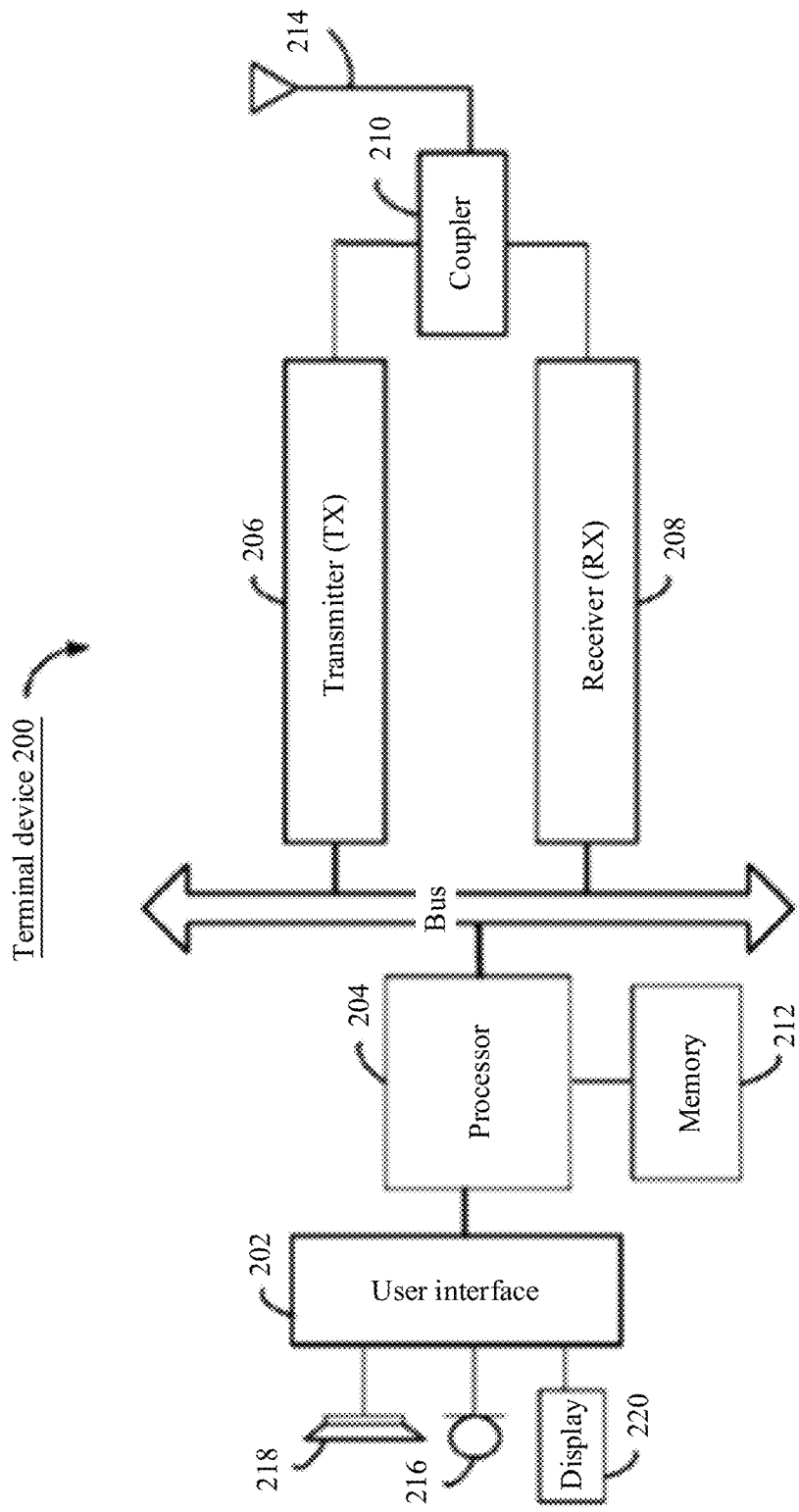
FIG. 2 is a schematic diagram of a structure of a terminal device according to an embodiment of this application.

FIG. 2 shows a terminal device according to an embodiment of this application. As shown in FIG. 2, a terminal device 200 may include input/output modules (including an audio input/output module 218, a key input module 216, a display 220, and the like), a user interface 202, one or more processors 204, a transmitter 206, a receiver 208, a coupler 210, an antenna 214, and a memory 212. These components may be connected through a bus or in another manner. In FIG. 2, an example in which the components are connected through the bus is used.

The antenna 214 may be configured to convert electromagnetic energy into electromagnetic waves in free space, or convert electromagnetic waves in free space into electromagnetic energy in a transmission line. The coupler 210 is configured to split a mobile communication signal received by the antenna 214 into a plurality of subsignals, and allocate the plurality of subsignals to a plurality of receivers 208.

The transmitter 206 may be configured to perform transmission processing on a signal output by the processor 204.

The receiver 208 may be configured to perform reception processing on the mobile communication signal received by the antenna 214.

In this embodiment of this application, the transmitter 206 and the receiver 208 may be considered as a wireless modem. The terminal device 200 may include one or more transmitters 206 and one or more receivers 208.

In addition to the transmitter 206 and the receiver 208 shown in FIG. 2, the terminal device 200 may further include another communication component, for example, a GPS module, a Bluetooth module, or a wireless fidelity (Wi-Fi) module. Not limited to supporting the foregoing wireless communication signal, the terminal device 200 may further support another wireless communication signal, for example, a satellite signal or a short-wave signal. Not limited to supporting wireless communication, the terminal device 200 may be further configured with a wired network interface (for example, a LAN interface) 201 to support wired communication.

The input/output modules may be configured to implement interaction between the terminal device 200 and a user/an external environment, and may mainly include the audio input/output module 218, the key input module 216, the display 220, and the like. In one embodiment, the input/output modules may also include a camera, a touchscreen, a sensor, and the like. All of the input/output modules communicate with the processor 204 through the user interface 202.

The memory 212 may be coupled to the processor 204 through the bus or an input/output port, or the memory 212 may be integrated with the processor 204. The memory 212 is configured to store various software programs and/or a plurality of groups of instructions. In one embodiment, the memory 212 may include a high-speed random access memory, and may also include a non-volatile memory, for example, one or more magnetic disk storage devices, a flash memory device, or another non-volatile solid-state storage device. The memory 212 may store an operating system (a system for short below), for example, an embedded operating system such as ANDROID, IOS, WINDOWS, or LINUX. The memory 212 may further store a network communication program. The network communication program may be for communication with one or more additional devices, one or more terminal devices, and one or more network devices. The memory 212 may further store a user interface program. The user interface program may vividly display content of an application by using a graphical operating window; and receive, by using an input control such as a menu, a dialog box, or a key, a control operation performed by a user on the application.

In this embodiment of this application, the memory 212 may be configured to store a program for implementing, on a side of a first device, a method for reporting a channel state information (CSI) provided in one or more embodiments of this application. For implementation of a method for reporting CSI of a multi-hop path provided in one or more embodiments of this application, refer to subsequent embodiments.

The processor 204 may be configured to read and execute computer-readable instructions. In one embodiment, the processor 204 may be configured to invoke a program stored in the memory 212, for example, a program for implementing, on a side of a first device, a method for reporting CSI of a multi-hop path provided in one or more embodiments of this application, and execute instructions included in the program to implement a method in a subsequent embodiment. The processor 204 may support one or more of global system for mobile communications (GSM) (2G) communication, wideband code division multiple access (WCDMA) (3G) communication, long term evolution (LTE) (4G) communication, 5G communication, and the like. In one embodiment, the processor 204 drives or controls the transmitter 206 to send any message or data.

In one embodiment, the processor 204 drives or controls the receiver 208 to receive any message or data. Therefore, the processor 204 may be considered as a control center for performing sending or reception, and the transmitter 206 and the receiver 208 are bodies for sending and reception operations.

It may be understood that the terminal device 200 may be the terminal device 102 in the communication system 100 shown in FIG. 1, and may be implemented as user equipment (UE), a terminal, an access terminal, a UE unit, a UE station, a mobile device, a mobile console, a mobile station, a mobile terminal, or the like.

It should be noted that the terminal device 200 shown in FIG. 2 is merely an implementation of embodiments of this application. In actual application, the terminal device 200 may further include more or fewer components. This is not limited herein.

Figures 3, 4A:
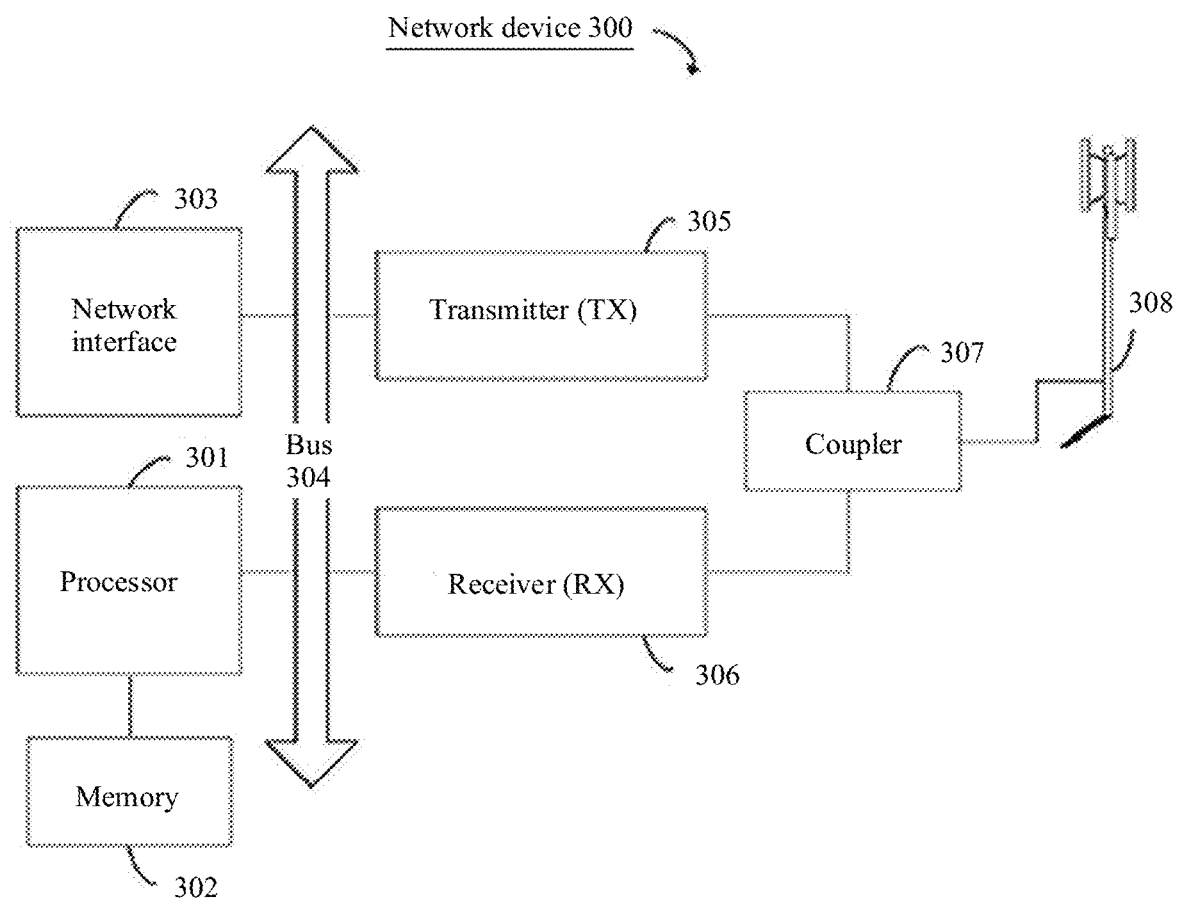
FIG. 3 is a schematic diagram of a structure of a network device according to an embodiment of this application.
FIG. 4*a* is a schematic flowchart of a method for reporting CSI of a multi-hop path according to an embodiment of this application.

FIG. 3 shows a network device according to an embodiment of this application. As shown in FIG. 3, a network device 300 may include one or more processors 301, a memory 302, a network interface 303, a transmitter 305, a receiver 306, a coupler 307, and an antenna 308. These components may be connected through a bus 304 or in another manner. In FIG. 3, an example in which the components are connected through the bus is used.

The network interface 303 may be used by the network device 300 for communicating with another communication device, for example, another network device. In one embodiment, the network interface 303 may be a wired interface.

The transmitter 305 may be configured to perform transmission processing, for example, signal modulation, on a signal output by the processor 301. The receiver 306 may be configured to perform reception processing, for example, signal demodulation, on a mobile communication signal received by the antenna 308. In some embodiments of this application, the transmitter 305 and the receiver 306 may be considered as a wireless modem. The network device 300 may include one or more transmitters 305 and one or more receivers 306. The antenna 308 may be configured to convert electromagnetic energy in a transmission line into electromagnetic waves in free space, or convert electromagnetic waves in free space into electromagnetic energy in a transmission line. The coupler 307 may be configured to split a received mobile communication signal into a plurality of subsignals and allocate the plurality of subsignals to a plurality of receivers 306.

The memory 302 may be coupled to the processor 301 through the bus 304 or an input/output port, or the memory 302 may be integrated with the processor 301. The memory 302 is configured to store various software programs and/or a plurality of groups of instructions. In one embodiment, the memory 302 may include a high-speed random access memory, and may also include a non-volatile memory, for example, one or more magnetic disk storage devices, a flash memory device, or another non-volatile solid-state storage device. The memory 302 may store an operating system (a system for short below), for example, an embedded operating system such as uCOS, VxWorks, or RTLinux. The memory 302 may further store a network communication program. The network communication program may be for communication with one or more additional devices, one or more terminal devices, and one or more network devices.

The processor 301 may be configured to manage a radio channel, make a call, establish and disconnect a communication link, provide cell handover control for a user in a local control area, and the like. In one embodiment, the processor 301 may include an administration module/communication module (AM/CM) (a center for speech channel switching and information exchange), a basic module (BM) (configured to implement call processing, signaling processing, radio resource management, radio link management, and a circuit maintenance function), a transcoder and submultiplexer (TCSM) (configured to implement multiplexing/demultiplexing and transcoding functions), and the like.

In this embodiment of this application, the processor 301 may be configured to read and execute computer-readable instructions. In one embodiment, the processor 301 may be configured to invoke a program stored in the memory 302, for example, a program for implementing, on a side of a first device, a method for reporting CSI of a multi-hop path provided in one or more embodiments of this application, and execute instructions included in the program.

It may be understood that the network device 300 may be the network device 101 in the communication system 100 shown in FIG. 1, and may be implemented as a base station, a wireless transceiver, a basic service set (BSS), an extended service set (ESS), a NodeB, an eNodeB, a gNB, or the like.

It should be noted that the network device 300 shown in FIG. 3 is merely an implementation of embodiments of this application. In actual application, the network device 300 may further include more or fewer components. This is not limited herein.

It should be noted that, in embodiments of this application, based on a location relationship between a signal coverage area of a base station and a terminal device, the terminal devices 102 may be classified into in-coverage UE, in-coverage edge UE, out-of-coverage edge UE, and out-of-coverage UE. In the following embodiments, a first device may be the network device 101 or the terminal device 102, a relay device may be the network device 101 or the terminal device 102, and a target device may be the network device 101 or the terminal device 102.

FIG. 4a is a schematic flowchart of a method for reporting CSI of a multi-hop path according to an embodiment of this application. The method may be implemented based on the communication system shown in FIG. 1. The multi-hop path includes a first device, a second device, and a third device, where the first device is a source device, and the second device is a target device. In other words, the first device forms at least one transmission path with the target device by using one or more relay devices, and the at least one transmission path includes (which may be alternatively replaced with contains, exists, has, or the like, and whose uniqueness is not limited herein) a path with N hops, where N is an integer greater than or equal to 2.

In a possible example, the third device is a relay device. The first device may be a source device, may be a previous-hop device of the relay device. The second device may be a target device, or may be a next-hop device of the relay device.

The method includes but is not limited to the following operations.

Operation S401: The first device obtains a first CSI report of a target transmission path, where the first CSI report indicates a channel state of a multi-hop transmission link in the target transmission path.

In an embodiment, the multi-hop may be N hops, where N is greater than or equal to 2. That is, the at least one transmission path may include a two-hop path, or may include a path with more than two hops.

The target transmission path is the multi-hop path, and is a path between the source device and the target device. In an example, the path between the source device and the target device is a one-hop or multi-hop transmission path from the source device to the target device, a one-hop or multi-hop transmission path from any target relay device to the target device, a one-hop or multi-hop transmission path from a next-hop device of the source device to the target device, or a one-hop or multi-hop transmission path from a next-hop device of any target relay device to the target device.

In addition, a direct path may also be formed between the first device and the second device, that is, data transmitted by the first device may be directly received by the second device. When a channel state of the direct path is not good, transmission or data forwarding on another supplementary link may be performed, to improve data reliability.

In actual application, any device may be designated as a source node. In this embodiment of this application, the first device is used as an example for detailed description.

The first CSI report is a joint CSI report, and the joint CSI report indicates a joint channel state of the multi-hop transmission link in the target transmission path.

The first CSI report may be named in various manners, for example, replaced with a target CSI report, and is not uniquely limited herein.

Figure 4B:
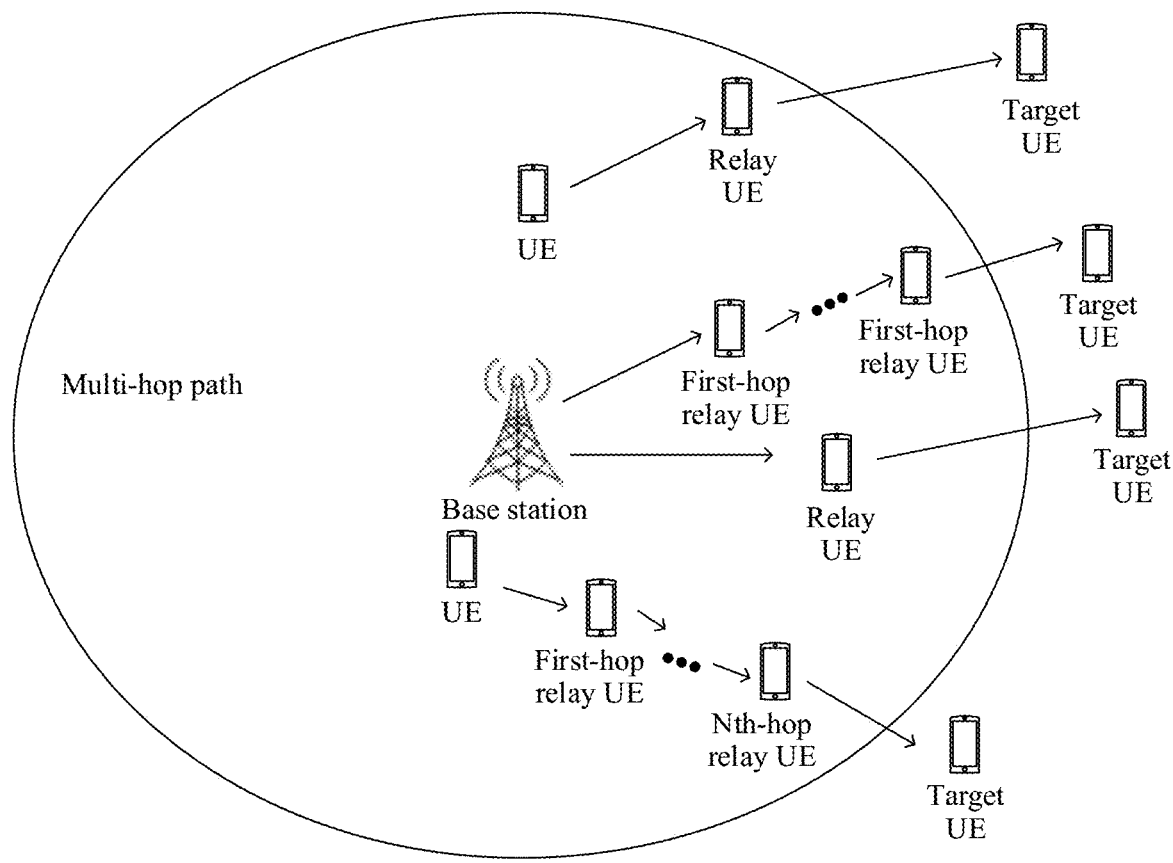
FIG. 4*b* is a schematic diagram of an example of a node combination in a multi-hop path according to an embodiment of this application.

As shown in a schematic diagram of a multi-hop path in FIG. 4b, nodes included in any one of the at least one transmission path may be any one of the following combinations: {base station, relay UE, target UE}, {UE, relay UE, base station}, {UE, relay UE, target UE}, {UE, first-hop relay UE, . . . , Nth-hop relay UE, target UE}, {base station, first-hop relay UE, Nth-hop relay UE, target UE}, {UE, first-hop relay UE, . . . , Nth-hop relay UE, target base station}, {base station, relay base station, target base station}, {base station, first-hop relay UE, . . . , Nth-hop relay UE, target base station}, and {base station, first-hop relay base station, . . . , Nth-hop relay base station, target base station}.

In one embodiment, for the combination {base station, relay UE, target UE}, the first device corresponds to the base station in the current combination, the relay device corresponds to the relay UE in the current combination, and the target device corresponds to the target UE in the current combination. The relay UE may be either in-coverage UE or in-coverage edge UE, and the target UE may be any one of in-coverage UE, in-coverage edge UE, out-of-coverage edge UE, and out-of-coverage UE. A plurality of types of combinations may be formed according to actual location distribution, and the following provides detailed descriptions with examples.

1. The relay UE is in-coverage UE, and the target device is in-coverage edge UE at a distance L1 from the base station.
2. The relay UE is in-coverage UE, and the target device is out-of-coverage edge UE at a distance L2 from the base station.
3. The relay UE is in-coverage UE, and the target device is out-of-coverage UE at a distance L3 from the base station, where L1 is less than L2, and L2 is less than L3.
4. The relay UE is in-coverage edge UE, and the target device is out-of-coverage edge UE at a distance L2 from the base station.
5. The relay UE is in-coverage edge UE, and the target device is out-of-coverage UE at a distance L3 from the base station.

For the combination {UE, relay UE, base station}, the first device corresponds to the UE in the current combination, the relay device corresponds to the relay UE in the current combination, and the target device corresponds to the base station in the current combination. Both the UE and the relay UE are terminal devices. A plurality of types of combinations may be formed according to actual location distribution of the devices, and the following provides detailed descriptions by using examples.

1. The first device is out-of-coverage UE, and the relay UE is in-coverage edge UE.
2. The first device is out-of-coverage UE, and the relay UE is in-coverage UE.
3. The first device is out-of-coverage edge UE, and the relay UE is in-coverage edge UE.
4. The first device is out-of-coverage edge UE, and the relay UE is in-coverage UE.
5. The first device is in-coverage edge UE, and the relay UE is in-coverage edge UE.
6. The first device is in-coverage edge UE, and the relay UE is in-coverage UE.
7. The first device is in-coverage UE, and the relay UE is in-coverage UE.

For the combination {UE, relay UE, target UE}, the first device corresponds to the UE in the current combination, the relay device corresponds to the relay UE in the current combination, and the target device corresponds to the target UE in the current combination. The UE, the relay UE, and the target UE are all terminal devices. A plurality of types of combinations may be formed according to actual location distribution of the devices, and the combination is not uniquely limited herein.

For the combination {UE, first-hop relay UE, . . . , Nth-hop relay UE, target UE}, the first device corresponds to the UE in the current combination, the relay device corresponds to the first-hop relay UE, . . . , and the Nth-hop relay UE in the current combination, and the target device corresponds to the target UE in the current combination. The UE, the first-hop relay UE, . . . , the Nth-hop relay UE, and the target UE are all terminal devices. A plurality of types of combinations may be formed according to actual location distribution of the devices, and the combination is not uniquely limited herein.

For the combination {base station, first-hop relay UE, . . . , Nth-hop relay UE, target UE}, the first device corresponds to the base station in the current combination, the relay device corresponds to the first-hop relay UE, . . . , and the Nth-hop relay UE in the current combination, and the target device corresponds to the target UE in the current combination. The UE, the first-hop relay UE, . . . , the Nth-hop relay UE, and the target UE are all terminal devices. The first-hop relay UE, . . . , the Nth-hop relay UE, and the target UE are all terminal devices. A plurality of types of combinations may be formed according to actual location distribution of the devices, and the combination is not uniquely limited herein.

In the foregoing various combinations, a link between terminal devices may be a sidelink, but is not limited to a sidelink application scenario. The link between the terminal devices may be a link in an unlicensed spectrum system, or may be a link an integrated access and backhaul link system. The sidelink is not limited to a D2D, V2V, or V2X scenario, or the like.

It can be learned that, in this example, the first device obtains the first CSI report of the target transmission path. Because the first CSI report indicates the target transmission path, a comprehensive channel state of the multi-hop path can be obtained from a data sending device, namely, the source device, by reporting first CSI.

In a possible example, the first CSI report is multi-level CSI, CSI at any level represents a CSI indication of a corresponding transmission link, and the transmission link is a direct path obtained by grouping the target transmission path based on a node connection relationship. In other words, CSI at each level represents a CSI indication of a corresponding transmission link, and the transmission link is a direct path obtained by grouping the target transmission path based on a node connection relationship.

For example, for a two-hop path, the joint CSI report includes two-level CSI, that is, first-level CSI representing a CSI indication between a first device and a relay device, and second-level CSI representing a CSI indication between the relay device and a target device.

For example, the two-level CSI may be expressed as {First hop CSI: X; Second hop CSI: Y;} (a first hop is a first node, and a second hop is a second node).

For example, the two-level CSI may alternatively be expressed as {1: X; 2: Y;}, that is, the first-hop CSI is correspondingly represented by or is represented in an associated manner by using an index 1, and the second-hop CSI is correspondingly represented by or is represented in an associated manner by using an index 2.

For example, the two-level CSI may alternatively be expressed as {X, Y}, that is, X and Y are sequentially sorted, and respectively represent first-hop CSI and second-hop CSI.

For example, the two-level CSI may alternatively be expressed as follows: During reporting of one piece of CSI, first bit fields of a specified quantity are first-hop CSI and last bit fields of a specified quantity are second-hop CSI; or during reporting of one piece of CSI, first bit fields of a specified quantity are second-hop CSI and last bit fields of a specified quantity are first-hop CSI. A bit field definition rule may be preconfigured for either a terminal device or a network device, or may be notified by the network device to the terminal device via signaling.

For example, the two-level CSI may alternatively be expressed as: first-hop CSI reported on a first resource, and second-hop CSI reported on a second resource. Either the first resource or the second resource may be preconfigured for either a terminal device or a network device, or may be notified by the network device to the terminal device via signaling. The first resource or the second resource is any time domain resource, frequency domain resource, or space domain resource.

In one embodiment, a format of the joint CSI report may be preconfigured, or may be configured via signaling.

It can be learned that, in this example, the joint CSI report uses multi-level CSI, so that a channel state of each transmission link in the multi-hop path is clearly indicated, which is simple and efficient.

In a possible example, the first CSI report is CSI obtained according to a first function.

The first function may also be referred to as a joint function or a function, and is not uniquely limited herein.

In this possible example, the first function is a function defined based on multi-level CSI of the target transmission path, and the multi-level CSI corresponds to a plurality of transmission links obtained by grouping the target transmission path based on a node connection relationship.

For example, for a two-hop path, the joint function may be expressed as Path_CSI=Func(SUE-CUE CSI, CUE-TUE CSI), where SUE-CUE CSI represents a channel state of a path from a source device to a relay device, and CUE-TUE CSI represents a channel state of a path from the relay device to a target device. In this example, the path from the source device to the relay device is a direct path, and the path from the relay device to the target device is a direct path.

The function Func(X,Y) may be any linear or non-linear function that uses X and Y as parameters, for example, a function generated by performing corresponding weighting on X and Y. For example, Func(X,Y)=K1×X+K2×Y, where K1 and K2 are parameters that are preset or configured via signaling.

It can be learned that, in this example, the comprehensive channel state of the multi-hop path in the target transmission path is calculated by using the first function, so that an amount of information is small and transmission is efficient.

In a possible example, the target transmission path is a transmission path that meets a preset reporting condition.

It can be learned that, in this example, a CSI reporting trigger condition of a CSI reporting device is restricted by using the preset reporting condition, effectively limiting repeated and invalid reporting of a low-quality transmission path and improving signaling transmission efficiency.

In a possible example, the preset reporting condition includes: First CSI of the transmission path is greater than or equal to a first preset threshold.

When the first CSI is joint CSI of multi-level CSI, that first CSI is greater than or equal to a first preset threshold means that an average value of the multi-level CSI is greater than or equal to the first preset threshold, each piece of CSI in the multi-level CSI is greater than or equal to the first preset threshold, or M pieces of CSI that are in the multi-level CSI and that are greater than or equal to a third preset threshold are all greater than or equal to the first preset threshold; and is not uniquely limited herein. In this application, "greater than" may be replaced with "greater than or equal to", and "less than" may be replaced with "less than or equal to".

When the first CSI is the CSI obtained according to the first function, that first CSI is greater than or equal to a first preset threshold means that an output value of the first function, namely, an integrated CSI value, is greater than or equal to the first preset threshold. For example, a linear weighted average value of the multi-level CSI is greater than the first preset threshold, or a non-linear weighted average value of the multi-level CSI is greater than the first preset threshold.

In one embodiment, the preset reporting condition may alternatively be periodic reporting, and a reporting periodicity may be preconfigured or configured via signaling.

It can be learned that reporting a transmission path with CSI good enough helps the source device identify a corresponding path that can ensure reliable transmission of the to-be-transmitted data, thereby improving reliable transmission of the data and improving spectrum utilization.

In a possible example, the preset reporting condition includes: The first CSI of the transmission path is less than or equal to a second preset threshold.

When the first CSI is joint CSI of multi-level CSI, that the first CSI is less than or equal to a second preset threshold means that an average value of the multi-level CSI is less than or equal to the second preset threshold, each piece of CSI of the multi-level CSI is less than or equal to the second preset threshold, or M pieces of CSI in the multi-level CSI that are greater than or equal to a third preset threshold are all less than or equal to the second preset threshold; and is not uniquely limited herein. In this application, "greater than" may be replaced with "greater than or equal to", and "less than" may be replaced with "less than or equal to".

When the first CSI is the CSI obtained according to the first function, that the first CSI is less than or equal to a second preset threshold means that an output value of the first function, namely, an integrated CSI value, is less than or equal to the second preset threshold. For example, a linear weighted average value of the multi-level CSI is less than the second preset threshold, or a non-linear weighted average value of the multi-level CSI is less than the second preset threshold.

The first preset threshold and the second preset threshold may be the same or different.

It can be learned that reporting a transmission path with CSI not good enough helps the source device avoid using a corresponding path that cannot ensure reliable transmission of the to-be-transmitted data, thereby improving spectrum utilization.

In this application, any threshold may be preconfigured or configured via signaling.

The first CSI is periodically or aperiodically reported, and may be preconfigured or configured via signaling. The aperiodic reporting may also be referred to as reporting by determining whether a trigger condition is met.

The first CSI is reported by using the multi-level CSI or reported by using the CSI generated via the first function, and may be preconfigured or configured via signaling.

In this application, configuration via signaling means configuration via at least one of radio resource control (RRC) signaling, medium access control (MAC) signaling, or physical layer signaling. For example, configuration via signaling means sending the foregoing signaling by the network device to the terminal device, or sending the foregoing signaling by the source device to the relay device.

In a possible example, reporting of the first CSI report is triggered in the following manner: The reporting of the first CSI report is triggered by using a sidelink control information (SCI) indication field.

The SCI may be one-level SCI, or may be SCI of a level in multi-level SCI, for example, first-level SCI or second-level SCI in two-level SCI. The multi-level SCI is multi-stage SCI.

It can be learned that, in this example, the first device may trigger, by using the SCI indication field, a device to report the first CSI report, so that no other dedicated signaling needs to be configured for the device that reports the first CSI report, thereby improving information indication efficiency.

In a possible example, reporting of the first CSI report is triggered in the following manner: The reporting of the first CSI report is triggered by using higher layer signaling configuration.

It can be learned that, in this example, the first device may trigger, by using the higher layer signaling configuration, the device to report the first CSI report, so that the device reporting the first CSI report can make a real-time response based on scheduling performed by the base station, thereby reducing a delay and improving efficiency.

In a possible example, that the first device obtains a first CSI report of a target transmission path includes: The first device receives the first CSI report of the target transmission path reported by the third device, where the third device is a next-hop device of the first device in the target transmission path.

When the target transmission path is a two-hop path, the relay device includes only the third device. When the target transmission path is a path with more than two hops, the relay device includes the third device, a second relay device, and the like.

In one embodiment, when the first device is a base station, the third device may be in-coverage UE of the base station or in-coverage edge UE of the base station. The first device may send higher layer signaling configuration to the third device to trigger reporting of the first CSI report.

When the first device is in-coverage UE, the third device may be any one of in-coverage UE, in-coverage edge UE, out-of-coverage edge UE, or out-of-coverage UE, and is determined according to a node combination in the target transmission path. The first device may trigger, by using an SCI indication field, reporting of the first CSI report.

When the first device is in-coverage edge UE, the third device may be any one of in-coverage edge UE, out-of-coverage edge UE, and out-of-coverage UE; and the first device may trigger, by using an SCI indication field, reporting of the first CSI report.

It can be learned that, in this example, first CSI is reported by using the next-hop device of the first device in the target transmission path. The next-hop device may obtain channel state information of a plurality of links connected to the next-hop device; therefore, the first CSI may include multihop information in the target transmission path, so that path state information that is more comprehensive can be obtained from the source device, thereby improving a transmission success rate and efficiency and improving spectrum utilization.

The device that reports the first CSI report may be the next-hop device of the first device in the target transmission path, or may be a network device accessed by the first device in the target transmission path, that is, the network device can obtain CSI of each hop of transmission link in the target transmission path, and comprehensively determine the first CSI.

The SCI on a sidelink is an example. In an access and backhaul link scenario or another scenario, information is not limited to SCI, but may be any downlink control information (DCI).

In a possible example, after the first device obtains the first CSI report of the target transmission path, the method further includes: The first device prioritizes the target transmission paths based on the first CSI report.

A high-priority transmission path is for transmission of a data packet with high-priority information, and a low-priority transmission path is for transmission of a data packet with low-priority information.

The first CSI report may include a level of each transmission path. A level classification mechanism is not uniquely limited.

In a first manner, a level in the level classification mechanism may be classified according to a constraint range formed by the first preset threshold and a fourth preset threshold. A level of a transmission path may be classified into three levels: a high level, a medium level, and a low level. The fourth preset threshold is greater than the first preset threshold. Table 1 shows correspondence between a level and a threshold range.

TABLE 1

| Correspondence between a level and a CSI threshold | |
| --- | --- |
| Level of a transmission path | First CSI report |
| High (S1) | First CSI is greater than a fourth preset threshold. |
| Medium (S2) | The first CSI is less than the fourth preset threshold and greater than a first preset threshold. |
| Low (S3) | The first CSI is less than the first preset threshold. |

Figure 4C:
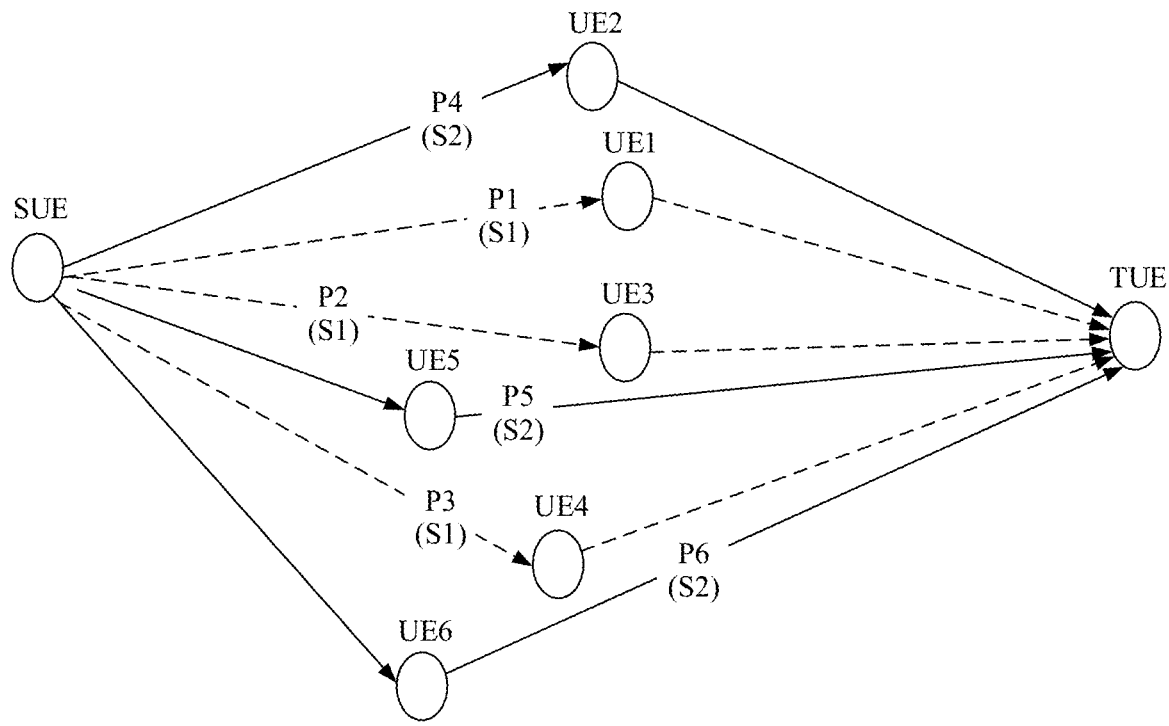
FIG. 4*c* is a schematic diagram of a plurality of transmission paths between a first device and a target device according to an embodiment of this application.

For example, as shown in FIG. 4c, it is assumed that there are six transmission paths between a first device (shown as SUE in the figure) and a target device (shown as TUE in the figure): a path P1 (with a relay device UE1), a path P2 (with a relay device UE3), a path P3 (with a relay device UE4), a path P4 (with a relay device UE2), a path P5 (with a relay device UE5), and a path P6 (with a relay device UE6). For example, the paths P1, P2, and P3 have good CSI and belong to a high level S1; and the paths P4, P5, and P6 have medium CSI and belong to a medium level S2.

The S1-level paths include relay paths corresponding to three relay UEs, and the three relay UEs are the UE1, UE3, and UE4. In the paths at this level, CSI in the path of the SUE, UE1, and TUE, the path of the SUE, UE3, and TUE, and the path of the SUE, UE4 and TUE is good; therefore, joint CSI is good. A path at this level may be for transmission of a data packet with higher priority information, and is marked as an S1-level path. The three relay UEs may perform transmission simultaneously or independently.

In one embodiment, in a case of a simultaneous transmission mechanism, the UE1, UE3, and UE4 may form different combinations for simultaneous transmission of different data packets or a same data packet. Combination types include {UE1, UE3}, {UE1, UE4}, {UE3, UE4}, and {UE1, UE3, UE4}. In one embodiment, a decision may be made according to one or more of a data volume of a to-be-transmitted data packet, a data packet priority, device statuses of the UE1, UE3, and UE4, and an occupation status of a transmission path. For example, for transmission of a high-priority data packet, simultaneous transmission may be performed in the three S1-level paths, and is not uniquely limited herein.

In the case of an independent transmission mechanism, any one of the UE1, UE3, and UE4 may be for transmission of a currently to-be-transmitted data packet, to improve resource utilization. A particular selection policy may be determined according to one or more of a data volume of a to-be-transmitted data packet, a data packet priority, device statuses of the UE1, UE3, and UE4, and an occupation status of a transmission path. For example, for transmission of a high-priority data packet, transmission may be performed in any one of the three S1-level paths, and is not uniquely limited herein.

The S2-level paths include relay paths corresponding to three relay UEs, and the three relay UEs are the UE2, UE5, and UE6. In the paths at this level, the UE2 is far away from the SUE and the TUE, leading to a poor channel condition; therefore, the path is a path having medium level CSI and is marked as an S2-level path. The UE5 is close to the SUE, but is far away from the TUE. In conclusion, the path is a path having medium level CSI and is marked as an S2-level path. The UE6 is far away from the SUE and the TUE, leading to a poor channel condition; therefore, the path is a path having medium level CSI and is marked as an S2-level path. Therefore, the S2-level path may be for transmission of a data packet of lower priority information, and is marked as a path P2. The three relay UEs may be configured for simultaneous transmission or independent transmission.

In one embodiment, in the case of a simultaneous transmission mechanism, the UE2, UE5, and UE6 may form different combinations for simultaneous transmission of a same data packet, to increase a transmission success rate. Combination types include {UE2, UE5}, {UE2, UE6}, {UE5, UE6}, and {UE2, UE5, UE6}. In one embodiment, a decision may be made according to one or more of a data volume of a to-be-transmitted data packet, a data packet priority, device statuses of the UE2, UE5, and UE6, and an occupation status of a transmission path. For example, for transmission of a low-priority data packet, simultaneous transmission may be performed in the three S2-level paths, and is not uniquely limited herein.

In the case of an independent transmission mechanism, any one of the UE2, UE5, and UE6 may be for transmission of a currently to-be-transmitted data packet, to improve resource utilization. A particular selection policy may be determined according to one or more of a data volume of a to-be-transmitted data packet, a data packet priority, device statuses of the UE2, UE5, and UE6, and an occupation status of a transmission path. For example, for transmission of a low-priority data packet, transmission may be performed in any one of the three S2-level paths, and is not uniquely limited herein.

In a second manner, the level classification mechanism may be comprehensively evaluated and determined based on a distance between a relay device and the first device, a distance between a relay device and the target device, and the like.

It can be learned that, in this example, classified transmission control can be performed on the transmission data more precisely through level classification of the transmission paths, thereby improving transmission path utilization and transmission stability.

It should be noted that the method for reporting the CSI of the multi-hop path disclosed in this embodiment of this application may be further presented by using a third device as an action body. The multi-hop path includes a first device, a second device, and the third device, where the first device is a source device, and the second device is a target device. The method includes:

The third device sends a first CSI report of a target transmission path to the first device. The third device is a next-hop device of the first device in the target transmission path, and the first CSI report indicates a channel state of a multi-hop transmission link in the target transmission path.

According to this embodiment of this application, the first device obtains the first CSI report of the target transmission path reported by the third device. Because the first CSI report indicates the target transmission path, a comprehensive channel state of the multi-hop path can be obtained from a data sending device, namely, the source device, by reporting first CSI.

In a possible example, the first CSI report is a joint CSI report, and the joint CSI report indicates a joint channel state of the multi-hop transmission link in the target transmission path.

In a possible example, the first CSI report is multi-level CSI, CSI at any level represents a CSI indication of a corresponding transmission link, and the transmission link is a direct path obtained by grouping the target transmission path based on a node connection relationship.

In a possible example, the first CSI report is CSI obtained according to a first function.

In a possible example, the first function is a function defined based on multi-level CSI of the target transmission path, and the multi-level CSI corresponds to a plurality of transmission links obtained by grouping the target transmission path based on a node connection relationship.

In a possible example, the target transmission path is a transmission path that meets a preset reporting condition.

In a possible example, the preset reporting condition includes at least one of the following:

First CSI of the transmission path is greater than or equal to a first preset threshold; and the first CSI of the transmission path is less than or equal to a second preset threshold.

In a possible example, reporting of the first CSI report is triggered in the following manner:

The reporting of the first CSI report is triggered by using a sidelink control information SCI indication field.

In a possible example, reporting of the first CSI report is triggered in the following manner:

The reporting of the first CSI report is triggered by using higher layer signaling configuration.

Figure 5:
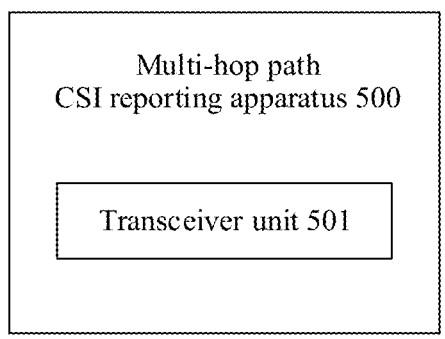
FIG. 5 is a composition block diagram of functional units of an apparatus for reporting CSI of a multi-hop path according to an embodiment of this application.

Based on the same concept as the foregoing method for reporting the CSI of the multi-hop path, as shown in FIG. 5, an embodiment of this application further provides an apparatus 500 for reporting CSI of a multi-hop path. The apparatus 500 includes a transceiver unit 501. An example is as follows:

The transceiver unit 501 is configured to obtain a CSI report of a target transmission path. The first CSI report indicates the target transmission path.

In one embodiment, the first CSI report is a joint CSI report, and the joint CSI report indicates a joint channel state of a multi-hop transmission link in the target transmission path.

In one embodiment, the first CSI report is a joint CSI report, and the joint CSI report indicates a joint channel state of a multi-hop transmission link in the target transmission path.

In one embodiment, the first CSI report is CSI obtained according to a first function.

In one embodiment, the first function is a function defined based on multi-level CSI of the target transmission path, and the multi-level CSI corresponds to a plurality of transmission links obtained by grouping the target transmission path based on a node connection relationship.

In one embodiment, the target transmission path is a transmission path that meets a preset reporting condition.

In one embodiment, the preset reporting condition includes at least one of the following:

First CSI of the transmission path is greater than or equal to a first preset threshold; and the first CSI of the transmission path is less than or equal to a second preset threshold.

In one embodiment, reporting of the first CSI report is triggered in the following manner:

The reporting of the first CSI report is triggered by using a sidelink control information (SCI) indication field.

In one embodiment, reporting of the first CSI report is triggered in the following manner:

The reporting of the first CSI report is triggered by using higher layer signaling configuration.

In one embodiment, the transceiver unit is configured to receive the first CSI report of the target transmission path reported by the third device, and the third device is a next-hop device of the first device in the target transmission path.

In one embodiment, the transceiver unit is configured to receive the first CSI report of the target transmission path reported by the third device, and the third device is a next-hop device of the first device in the target transmission path.

For functions of the transceiver unit 501, refer to related descriptions of the terminal device in the embodiment shown in FIG. 2. Details are not described herein again.

According to this embodiment of this application, the first device obtains the first CSI report of the target transmission path. Because the first CSI report indicates the target transmission path, a comprehensive channel state of the multi-hop path can be obtained from a data sending device, namely, a source device, by reporting first CSI.

Figure 6:
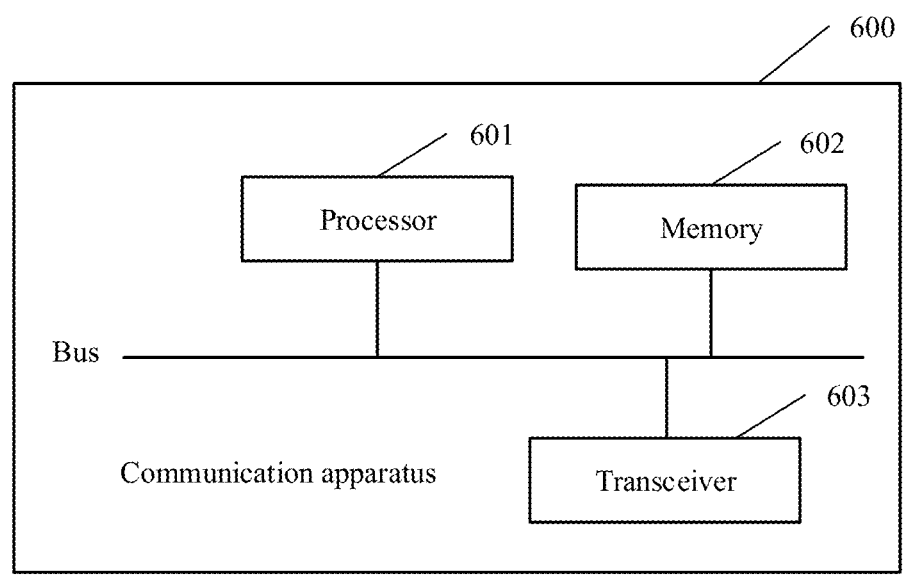
FIG. 6 is a schematic diagram of a structure of a communication apparatus according to an embodiment of this application.

FIG. 6 shows a communication apparatus 600 according to an embodiment of this application. The communication apparatus 600 is a first device. The communication apparatus 600 includes a processor 601, a memory 602, and a transceiver 603. The processor 601, the memory 602, and the transceiver 603 are connected to each other through a bus. The memory 602 includes but is not limited to a random access memory (RAM), a read-only memory (ROM), an erasable programmable read-only memory (EPROM), or a portable read-only memory (compact disc read-only memory, CD-ROM). The memory 602 is configured to store related instructions and related data. The transceiver 603 is configured to receive and send data. The processor 601 may be one or more central processing units (CPU). When the processor 701 is one CPU, the CPU may be a single-core CPU or a multi-core CPU. The processor 601 in the communication apparatus 600 is configured to read program code stored in the memory 602, to perform the following operations:

obtaining a first CSI report of a target transmission path, where the first CSI report indicates the target transmission path.

It should be noted that, for implementation of each operation, refer to corresponding descriptions in the method embodiment shown in FIG. 2.

An embodiment of this application further provides a communication apparatus, including a processor and an interface circuit. The interface circuit is configured to receive code instructions and transmit the code instructions to the processor. The processor executes the code instructions to perform a part or all of the operations of any one of the methods described in the foregoing method embodiments.

An embodiment of this application further provides a computer storage medium. The readable storage medium is configured to store instructions. When the instructions are executed, the method described in any one of the foregoing method embodiments is implemented.

An embodiment of this application further provides a computer program product. The computer program product includes a non-transitory computer-readable storage medium storing a computer program. The computer program is operable to enable a computer to perform a part or all of the operations of any one of the methods described in the foregoing method embodiments. The computer program product may be a software installation package, and the computer includes an electronic device.

A person of ordinary skill in the art may understand that all or a part of the processes of the methods in the embodiments may be implemented by a computer program instructing related hardware. The program may be stored in a computer-readable storage medium. When the program is executed, the processes in the foregoing method embodiments are performed. The foregoing storage medium includes any medium that can store program code, such as a ROM, a random access memory (RAM), a magnetic disk, or an optical disc.

The invention claimed is:

1. A method for reporting channel state information (CSI) of a multi-hop path, wherein, the multi-hop path comprises a first device, a second device, and a third device, wherein, the first device is a source device, and the second device is a target device, the method comprising:
   obtaining, by the first device, a first CSI report of a target transmission path, wherein, the first CSI report indicates a channel state of a multi-hop transmission link in the target transmission path.

2. The method according to claim 1, wherein, the first CSI report is a joint CSI report, and the joint CSI report indicates a joint channel state of the multi-hop transmission link in the target transmission path.

3. The method according to claim 1, wherein, the first CSI report is multi-level CSI, wherein, CSI at any level represents a CSI indication of a corresponding transmission link, and the transmission link is a direct path obtained by grouping the target transmission path based on a node connection relationship.

4. The method according to claim 1, wherein, the first CSI report is CSI obtained according to a first function.

5. The method according to claim 4, wherein, the first function is a function defined based on multi-level CSI of the target transmission path, and the multi-level CSI corresponds to a plurality of transmission links obtained by grouping the target transmission path based on a node connection relationship.

6. The method according to claim 1, wherein, the target transmission path is a transmission path that meets a preset reporting condition.

7. The method according to claim 6, wherein, the preset reporting condition comprises at least one of:
   a first CSI of the transmission path is greater than or equal to a first preset threshold; and
   the first CSI of the transmission path is less than or equal to a second preset threshold.

8. The method according to claim 1, wherein, reporting of the first CSI report is triggered includes:
   the reporting of the first CSI report is triggered by using a sidelink control information (SCI) indication field.

9. The method according to claim 1, wherein, reporting of the first CSI report is triggered includes:
   the reporting of the first CSI report is triggered by using higher layer signaling configuration.

10. The method according to claim 1, wherein, the obtaining, by the first device, a first CSI report of a target transmission path comprises:
    receiving, by the first device, the first CSI report of the target transmission path reported by the third device, wherein the third device is a next-hop device of the first device in the target transmission path.

11. An apparatus for reporting CSI of a multi-hop path, wherein, the apparatus is used in a first device, and the multi-hop path comprises the first device, a second device, and a third device, wherein, the first device is a source device, and the second device is a target device, and the apparatus comprises:

one or more processors; and a storage medium configured to store program instructions, wherein, when executed by the one or more processors, the program instructions cause the apparatus to perform operations comprising:

obtaining a first CSI report of a target transmission path, wherein, the first CSI report indicates a channel state of a multi-hop transmission link in the target transmission path.

12. The apparatus according to claim 11, wherein, the first CSI report is a joint CSI report, and the joint CSI report indicates a joint channel state of the multi-hop transmission link in the target transmission path.

13. The apparatus according to claim 11, wherein, the first CSI report is multi-level CSI, wherein, CSI at any level represents a CSI indication of a corresponding transmission link, and the transmission link is a direct path obtained by grouping the target transmission path based on a node connection relationship.

14. The apparatus according to claim 11, wherein, the first CSI report is CSI obtained according to a first function.

15. The apparatus according to claim 14, wherein, the first function is a function defined based on multi-level CSI of the target transmission path, and the multi-level CSI corresponds to a plurality of transmission links obtained by grouping the target transmission path based on a node connection relationship.

16. The apparatus according to claim 11, wherein, the target transmission path is a transmission path that meets a preset reporting condition.

17. The apparatus according to claim 16, wherein, the preset reporting condition comprises at least one:

a first CSI of the transmission path is greater than or equal to a first preset threshold; and the first CSI of the transmission path is less than or equal to a second preset threshold.

18. The apparatus according to claim 11, wherein, reporting of the first CSI report is triggered includes:

the reporting of the first CSI report is triggered by using a sidelink control information (SCI) indication field.

19. The apparatus according to claim 11, wherein reporting of the first CSI report is triggered includes:

the reporting of the first CSI report is triggered by using higher layer signaling configuration.

20. The apparatus according to claim 11, wherein, the operations further comprise:

receiving the first CSI report of the target transmission path reported by the third device, wherein the third device is a next-hop device of the first device in the target transmission path.

* * * * *